United States Patent
Hentges

(10) Patent No.: US 8,066,108 B2
(45) Date of Patent: Nov. 29, 2011

(54) VESSEL ESCAPE SLIDES AND ASSOCIATED EQUIPMENT

(75) Inventor: Robert William Hentges, Brick, NJ (US)

(73) Assignee: Air Cruisers Company, Wall, NJ (US)

( * ) Notice: Subject to any disclaimer, the term of this patent is extended or adjusted under 35 U.S.C. 154(b) by 484 days.

(21) Appl. No.: 12/233,706

(22) Filed: Sep. 19, 2008

(65) Prior Publication Data

US 2009/0084655 A1 Apr. 2, 2009

Related U.S. Application Data

(60) Provisional application No. 60/995,563, filed on Sep. 27, 2007.

(51) Int. Cl.
*B65G 11/00* (2006.01)

(52) U.S. Cl. .............. 193/25 B; 244/905; 244/137.2; 182/48

(58) Field of Classification Search ............. 193/25 R, 193/25 A, 25 B, 25 C; 244/905, 137.2; 182/70, 182/76, 48; 441/40, 41, 42
See application file for complete search history.

(56) References Cited

U.S. PATENT DOCUMENTS

| | | | | |
|---|---|---|---|---|
| 2,264,321 A | * | 12/1941 | Manson | 244/1 R |
| 2,733,042 A | * | 1/1956 | Culbertson | 251/75 |
| 3,165,763 A | | 1/1965 | Gaylord | |
| 3,341,871 A | * | 9/1967 | Oliveau | 441/10 |
| 4,125,235 A | | 11/1978 | Fitzgerald et al. | |
| 4,167,276 A | * | 9/1979 | Bell et al. | 280/731 |
| 4,269,386 A | | 5/1981 | Crowe | |
| 4,441,582 A | * | 4/1984 | Ward, Jr. | 182/48 |
| 4,567,977 A | | 2/1986 | Fisher | |
| 5,039,125 A | * | 8/1991 | Buma et al. | 280/734 |
| 5,161,754 A | | 11/1992 | Duggal | |

OTHER PUBLICATIONS

International Search Report and Written Opinion dated Mar. 9, 2009 in related Application No. PCT/US2008/076929.

* cited by examiner

*Primary Examiner* — Gene Crawford
*Assistant Examiner* — William R Harp
(74) *Attorney, Agent, or Firm* — Dean W. Russell; Kilpatrick Townsend & Stockton LLP

(57) ABSTRACT

Systems for inhibiting installation of emergency escape slides behind bustles (or other covers) when removable safety pins (or similar objects) remain intact are addressed. Versions of the systems mechanically interfere with installation of the bustles as long as the safety pins remain in place. Only when all safety pins are removed can the mechanical impediment be detached (or moved sufficiently) to permit installation of the bustles.

13 Claims, 5 Drawing Sheets

VESSEL ESCAPE SLIDES AND ASSOCIATED EQUIPMENT

REFERENCE TO PROVISIONAL APPLICATION

This application is based on and hereby refers to U.S. Provisional Patent Application Ser. No. 60/995,563, filed Sep. 27, 2007, and having the same title as appears above, the entire contents of which provisional patent application are incorporated herein by this reference.

FIELD OF THE INVENTION

This invention relates to mechanisms for inhibiting improper placement of equipment within enclosures and more specifically, although not necessarily exclusively, to mechanical means for interfering with bustle placement over undeployed (packed) escape slides until certain safety pins have been removed from the slides.

BACKGROUND OF THE INVENTION

Commercial fixed-wing aircraft, among other types of transport vessels, frequently include one or more doors for ingress and egress of passengers and crew. Because of the substantial size of many of these aircraft, the doors are well above the ground or other surface supporting the aircraft. In an emergency situation when mobile stairs or pedestrian bridges are unavailable to facilitate passengers exiting an aircraft, inflatable escape slides may be deployed to span distances between the aircraft doors and the supporting surfaces.

U.S. Pat. No. 4,567,977 to Fisher, whose contents are incorporated herein in their entirety by this reference, illustrates one such inflatable slide. As noted in the Fisher patent, the slides commonly are stored in deflated condition adjacent exit doors of aircraft. Other than, perhaps, during conduct of certain maintenance, the slides are not intended to be inflated unless needed to assist passengers in evacuating the aircraft. By contrast, should the slides be needed for this purpose, they are designed to inflate and deploy rapidly to minimize evacuation delay.

U.S. Pat. No. 4,125,235 to Fitzgerald, et al., whose contents also are incorporated herein in their entirety by reference, depicts an escape slide packed within or adjacent a door. A bustle usually covers the packed slide during normal operation of the aircraft. This covering is advantageous for multiple reasons, including that it protects the slide (and particularly its inflatable components) from punctures or wear caused by contact with, for example, passengers, luggage, food and trash carts, etc. Covering the slide also inhibits accidental or premature deployment. Finally, the bustle may perform aesthetic functions as part of the cabin of the aircraft.

At all times prior to installation in an aircraft, a slide also is susceptible to damage, unpacking, and (possibly) undesired deployment. Accordingly, slides typically include one or more safety pins or similar devices designed to prevent or reduce likelihood of these types of unintended occurrences pre-installation. Importantly, though, these safety pins must be removed as part of the installation process. Otherwise, a slide may be installed and covered by a bustle in a non-functional state. Indeed, such installation in a non-functional state has occurred previously aboard commercial aircraft and been documented by the U.S. Federal Aviation Administration (FAA).

SUMMARY OF THE INVENTION

The present invention is designed to inhibit, if not prevent, installation of emergency escape slides behind bustles when safety pins have not been removed. Presently preferred versions of the invention mechanically interfere with installation of the bustles as long as the safety pins remain in place. Only when all safety pins are removed can the mechanical impediment be detached (or moved sufficiently) to permit installation of the bustles.

In certain versions of the invention, a rigid post provides the mechanical interference. The post is threaded and screwed into a mating flange permanently attached to a packed slide. The post extends outward from the packed slide a distance greater than the spacing between the slide and its corresponding bustle. Hence, should an attempt be made to install a bustle while the post is intact, the (rigid) post will impact the bustle and inhibit further installation.

Lanyards, ribbons, or similar elongated objects may connect the post to the safety pins present in the slide. Such elongated objects preferably have significant strength so as to resist cutting or tearing. Beneficially, the elongated objects will be tensioned when the post is mated with the flange.

Any attempt to unscrew the post from the flange will cause the elongated objects to wind around the post as the post is rotated. If unscrewing is attempted while the safety pins are in place, the tension and strength of the elongated objects will prevent any significant rotation of the post. (Alternatively, unscrewing the post conceivably could cause forcible removal of the safety pins, although this result is not preferred.) By contrast, if the safety pins are correctly removed from the packed slide, the post may be completely unscrewed from the flange, with the (now slack) lanyards generally winding around the post as it rotates. After the post is completely removed from the flange, the bustle may be installed over the packed slide without interference.

Many current commercial escape slides include two safety pins when initially packed, one typically connected to the inflation valve and the other attached to the pack release mechanism. For these slides, a separate lanyard or similar object may be utilized to connect each safety pin to the post. Therefore, even if one pin is removed (so that its corresponding lanyard is slack), tension in the lanyard connecting the second pin to the post will remain and prevent the post from being unscrewed from the flange.

It thus is an optional, non-exclusive object of the present invention to provide systems for interfering with installation of devices until certain safety mechanisms are removed.

It is also an optional, non-exclusive object of the present invention to provide systems for mechanically interfering with premature installation of devices.

It is another optional, non-exclusive object of the present invention to provide systems for preventing, or at least inhibiting, installation of bustles or other covers over packed escape slides until safety pins are removed.

It is a further optional, non-exclusive object of the present invention to provide systems utilizing a protruding rigid component to function as the installation inhibitor.

It is, moreover, an optional, non-exclusive object of the present invention to provide systems in which lanyard, ribbons, or other elongated objects connect the protruding rigid component to safety pins of a packed escape slide.

It is yet another optional, non-exclusive object of the present invention to provide systems in which attempted premature removal of the protruding rigid component tensions at least one of the elongated objects.

Other objects, features, and advantages of the present invention will be apparent to those having skill in the appropriate fields with reference to the remaining text and the drawings of this application.

DETAILED DESCRIPTION

Figure 1:
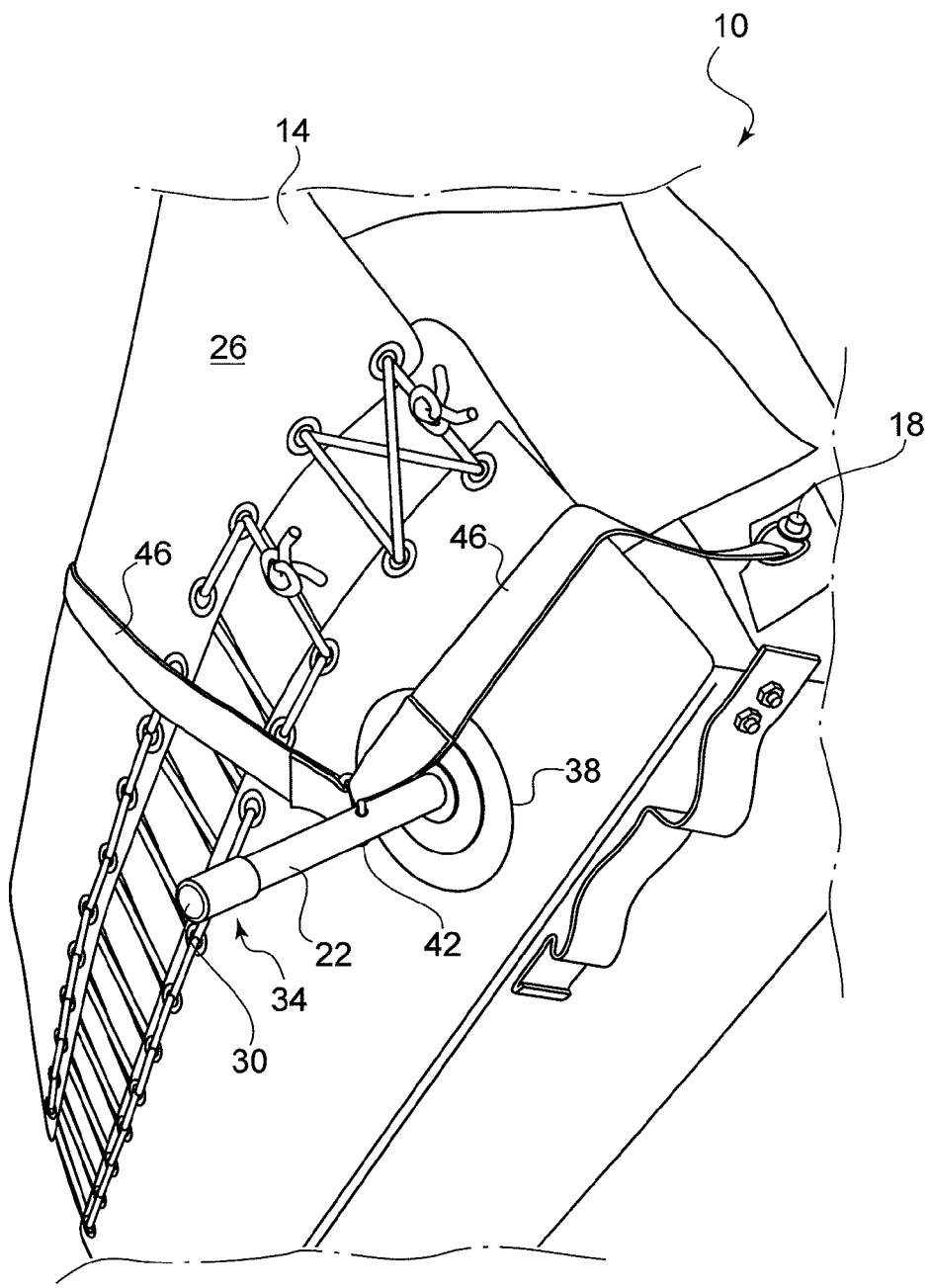
FIG. 1 illustrates portions of a packed escape slide with a bustle interference system in place.
Figure 2:
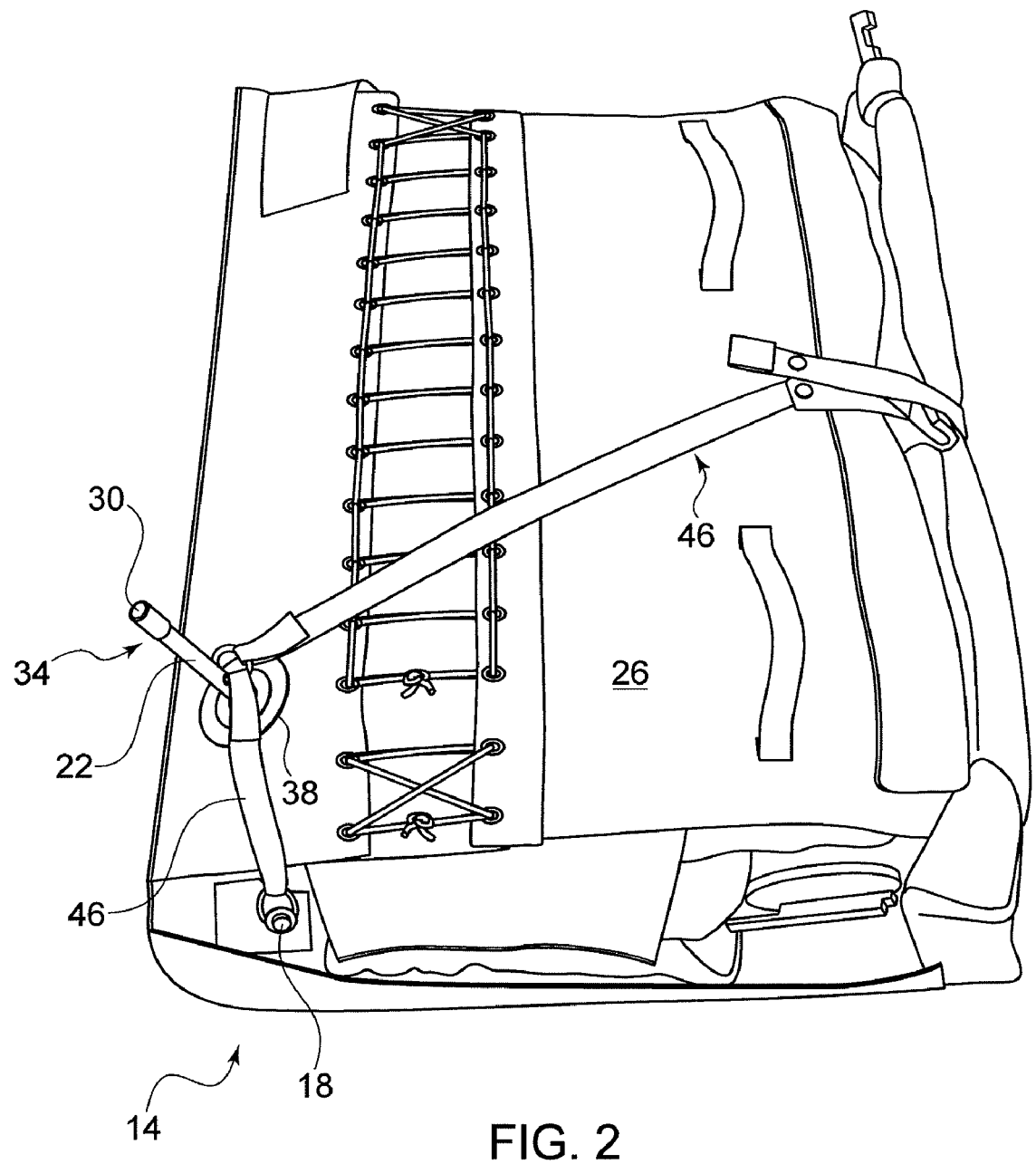
FIG. 2 illustrates the system of FIG. 1.
Figure 3:
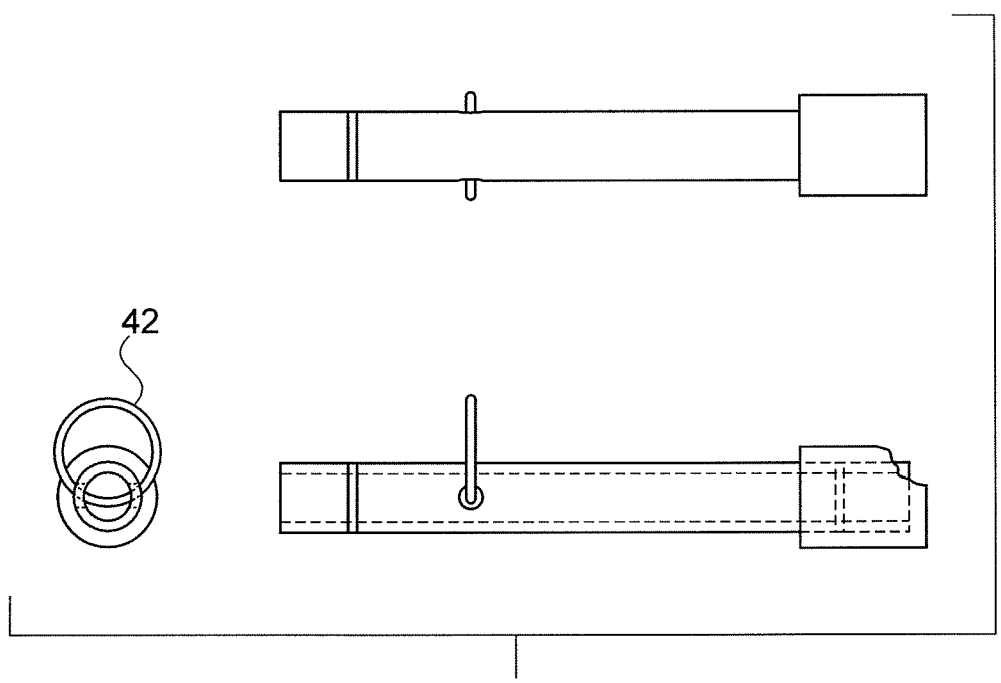
FIG. 3 shows the rigid post of the system of FIG. 1.

Illustrated in FIGS. 1-2 are portions of system 10 of the present invention. Also detailed in these figures is slide assembly 14, which may comprise a conventional escape slide and associated equipment typically used for commercial aircraft. Slide assembly 14 need not necessarily be conventional; instead, in some cases it may constitute any such assembly useful for providing low-friction, gravitationally-based transport of persons, animals, or cargo from one place to another. Likewise, slide assembly 14 need not necessarily be intended for use in commercial aircraft, as passenger evacuation requirements may exist for ships, buildings, or other fixed or mobile structures as well.

As depicted in FIGS. 1-2, slide assembly 14 is packed into a small volume for transport or installation prior to deployment and use. Packing in this manner is especially important when assembly 14 is to be used on-board commercial aircraft, in which space available for such equipment often is modest. So packing assembly 14 also helps protect its fragile components prior to deployment. Further, as noted above, as packed assembly 14 may be covered by a bustle or similar cover for protective and decorative purposes.

Figure 4:
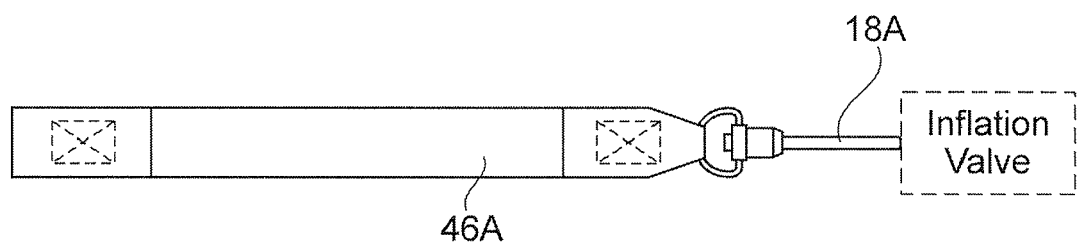
FIG. 4 depicts a first elongated object of the system of FIG. 1 designed to connect the rigid post to a first safety pin.
Figure 5:
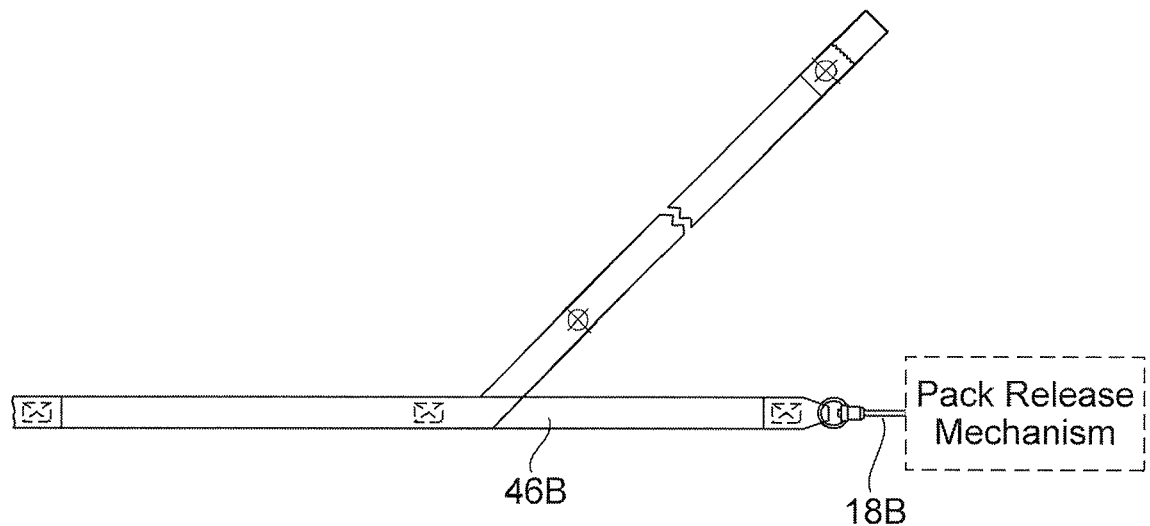
FIG. 5 depicts a second elongated object of the system of FIG. 1 designed to connect the rigid post to a second safety pin.
Figure 6:
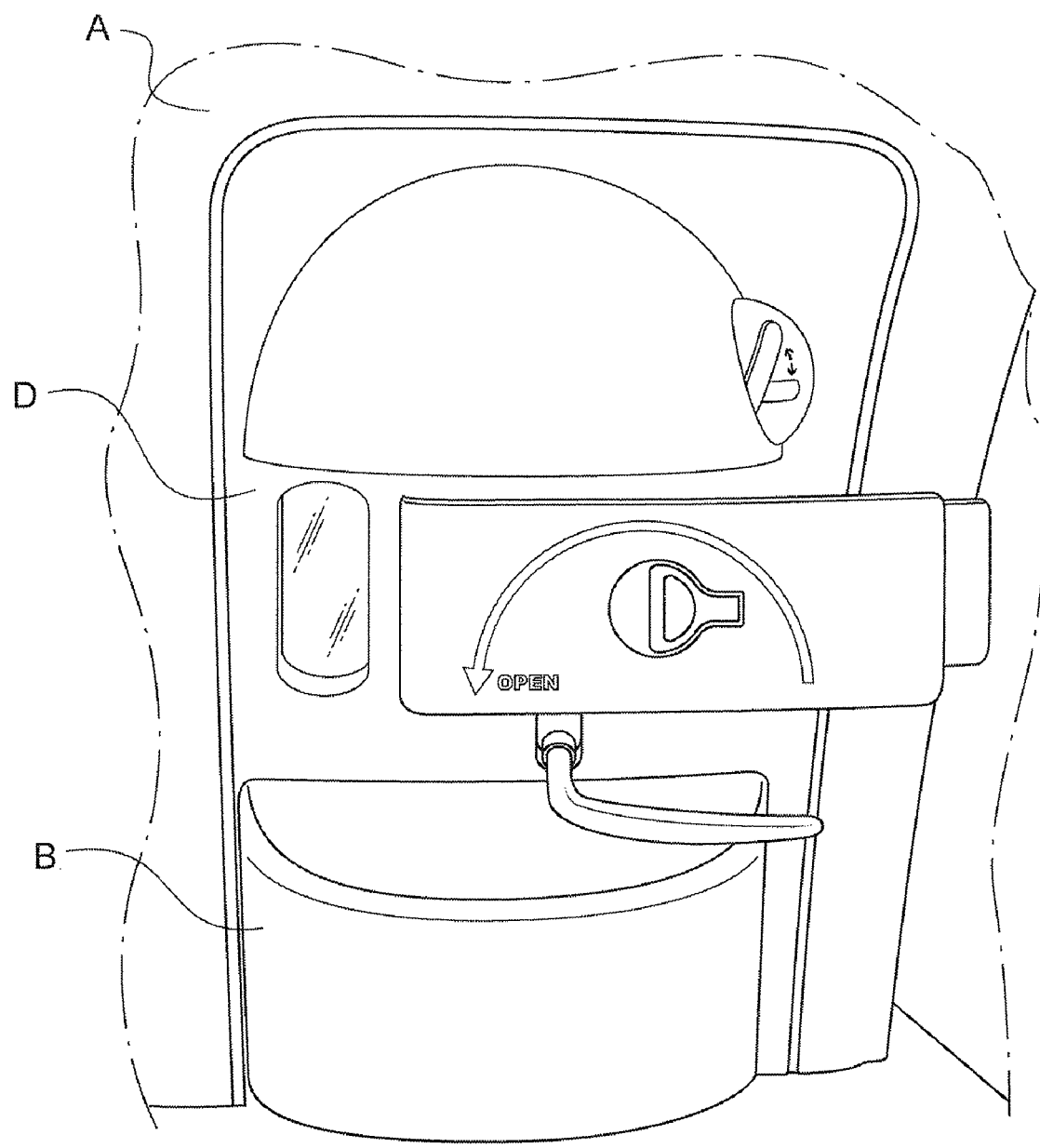
FIG. 6 shows a conventional door (D) and bustle (B) of an aircraft (A).

Because deployment of slide assembly 14 prior to its on-board installation is undesirable (and potentially hazardous), assembly 14 conventionally incorporates fail-safe mechanisms designed to render it inoperable when the mechanisms are employed. Consistent with many existing assemblies, slide assembly 14 includes one or more safety pins 18. Presently preferred versions of assembly 14 include two such pins 18, one disabling the inflation valve and the other disabling the pack release mechanism of the assembly 14. FIG. 4 illustrates one such pin 18A for attachment to the inflation valve, whereas FIG. 5 illustrates the other pin 18B connected to the pack release mechanism. Those skilled in the art will, of course, recognize that other fail-safe mechanisms may be used instead of or in addition to pins 18 and that pins 18, if utilized, may connect to other portions of assembly 14 than as shown in FIGS. 1-2.

Also depicted in FIGS. 1-2 is element 22 of system 10. Element 22 advantageously is rigid (or at least relatively inflexible) and configured to protrude outward from slide assembly 14. As a consequence, when element 22 is attached to slide assembly 14, it interferes with attempted placement of a cover flush with surface 26 of assembly 14.

Preferred versions of element 22 comprise elongated, rigid posts made of metal or other strong material. Beyond being relatively inflexible, such posts preferably are lightweight so as not to increase the overall weight of system 10 and assembly 14 unduly. Although FIGS. 1-2 show rounded covering 30 at distal end 34 of element 22, such covering 30 is optional and may be omitted if desired. Similarly, element 22 need not necessarily be shaped as an elongated post.

Also illustrated as part of system 10 is mating flange 38 permanently attached to slide assembly 14. Both flange 38 and element 22 beneficially may be threaded, so that element 22 screws into (and out of) flange 38. Other fastening mechanism could, however, be employed. Likewise, flange 38 and element 22 need not be located in the positions shown in the figures; instead, they may be positioned in any manner suitable to interfere with attempted covering of assembly 14.

System 10 further may include ring 42 and one or more lanyards 46, ribbons, or other elongated objects. Ring 42 is connected to or formed together with element 22. Lanyards 46, by contrast, are intended to be securely received by ring 42 so as to connect pins 18 to element 22. FIG. 4 details a lanyard 46A designed to connect pin 18A to element 22, while FIG. 5 illustrates a second lanyard 46B configured to connect pin 18B to element 22.

Shown especially in FIGS. 1-2, lanyards 46 preferably are taut (tensioned) when in use and constructed of material unlikely to tear or break. Hence, for example, if pin 18A is not removed, the taut lanyard 46A will resist any attempt to rotate element 22 out of flange 38. Likewise, if pin 18B is not removed, tensioned lanyard 46B will resist rotation of element 22. Moreover, even if some slack initially exists in lanyards 46, initial rotation of element 22 will cause the lanyards 46 to wind around the element 22, taking up the slack and preventing further rotation. Only if both pins 18A-B are removed will lanyards 46A-B become slack and cease resisting rotation of element 22.

Because element 22 may not be rotated out of flange 38 while any pin 18 remains in place, no bustle or other cover may be placed proximate surface 26 of slide assembly 14. If, on the other hand, all pins 18 are removed, element 22 may be removed completely from flange 38 and stored so that it no longer protrudes outward from surface 26. In this latter circumstance, a bustle or other cover may then be positioned flush with surface 26 without interference.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An evacuation slide assembly system for installation on-board a vessel, the system comprising:
   a. an evacuation slide assembly comprising (i) an inflatable slide and (ii) removable means for disabling inflation of the slide; and
   b. means, distinct from the disabling means, for preventing installation of the assembly behind a bustle of the vessel unless the disabling means is removed.

2. A system according to claim 1 in which the installation-preventing means is an elongated rigid element.

3. A system according to claim 2 in which the element protrudes outward from the assembly.

4. A system according to claim 3 in which the assembly also comprises a threaded flange and the element is a threaded post received in and removable from the flange.

5. A system according to claim 4 in which the inflation-disabling means comprises a pin.

6. A system according to claim 5 further comprising an inflation valve and in which the pin is connected to both the inflation valve and the post.

7. A system according to claim 6 further comprising means for connecting the pin to the post so as to prevent removal of the post from the flange unless the pin is disconnected from the inflation valve.

8. An evacuation slide assembly system for installation on-board a vessel, the system comprising:
   a. an inflation valve;
   b. a flange;
   c. an evacuation slide assembly comprising (i) an inflatable slide and (ii) removable means, comprising a pin connected to the inflation valve, for disabling inflation of the slide;
   d. means, comprising a rigid post received in the flange, for preventing installation of the assembly unless the disabling means is removed; and
   e. means, comprising an elongated flexible object, for connecting the pin to the post so as to prevent removal of the post from the flange unless the pin is disconnected from the inflation valve.

9. A system according to claim 8 in which the elongated flexible object is a lanyard or a ribbon.

10. A system according to claim 9 in which (a) the vessel is an aircraft comprising the bustle behind which the assembly is to be installed and (b) the post protrudes outward from the assembly a distance greater than the distance existing between the assembly and the bustle when both are installed.

11. A system according to claim 10 further comprising a pack release assembly and in which the assembly comprises a second pin connected to both the pack release mechanism and the post.

12. A method of installing an evacuation slide assembly system on-board an aircraft, comprising:
   a. disabling inflation of the slide assembly using a pin;
   b. removing the pin so as to enable (i) inflation of the slide assembly and (ii) removal of an element protruding from the assembly, such element being distinct from the pin and preventing installation of the assembly behind a bustle of the aircraft until removed; and
   c. removing the element so as to permit installation of the assembly behind the bustle.

13. A method according to claim 12 further comprising installing the assembly behind the bustle.

* * * * *